US010496064B2

(12) United States Patent
Yamamoto (10) Patent No.: US 10,496,064 B2
(45) Date of Patent: Dec. 3, 2019

(54) SELECTION DEVICE AND NETWORK SYSTEM FOR SELECTING ELECTRIC MOTOR SYSTEM

(71) Applicant: FANUC CORPORATION, Yamanashi (JP)

(72) Inventor: Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/345,659

(22) Filed: Nov. 8, 2016

(65) Prior Publication Data

US 2017/0139391 A1 May 18, 2017

(30) Foreign Application Priority Data

Nov. 13, 2015 (JP) ................................. 2015-222788

(51) Int. Cl.
*G05B 19/042* (2006.01)
*G05B 11/01* (2006.01)
*H02P 5/00* (2016.01)

(52) U.S. Cl.
CPC .......... *G05B 19/0428* (2013.01); *G05B 11/01* (2013.01); *H02P 5/00* (2013.01);
(Continued)

(58) Field of Classification Search
CPC ........... G05B 2219/23253; G05B 2219/31351; G05B 2219/41277
(Continued)

(56) References Cited

U.S. PATENT DOCUMENTS 5,943,245 A * 8/1999 Melfi ...................... G06F 17/50
703/1
2002/0107751 A1* 8/2002 Rajagopalan ........ G06Q 10/087
705/26.82
(Continued)

FOREIGN PATENT DOCUMENTS

CN 101878589 A 11/2010
CN 102611366 A 7/2012
(Continued)

OTHER PUBLICATIONS

Beckhoff Automation, "Operating instructions Servo Drives AX5000" Beckhoff Drive Technology, Nov. 3, 2009, 110 Pgs. (Year: 2009).*
(Continued)

*Primary Examiner* — Emilio J Saavedra
(74) *Attorney, Agent, or Firm* — Fredrikson & Byron, P.A.

(57) ABSTRACT

A selection device which can reduce labor involved in the setting operation of a controller. The selection device includes an information reception part which receives a machine condition, a storage which stores specification data, a selection part which compares the machine condition received by the information reception part with the specification data stored in the storage to select the electric motor system that meets the machine condition, and a parameter generation part which generates a controller parameter configured to allow a controller which controls the electric motor system selected by the selection part to set in the controller, an operation parameter involved in operating the electric motor system.

3 Claims, 5 Drawing Sheets

(52) U.S. Cl.
CPC .............. *G05B 2219/23253* (2013.01); *G05B 2219/31351* (2013.01); *G05B 2219/34226* (2013.01); *G05B 2219/41277* (2013.01)

(58) Field of Classification Search
USPC ........................................................ 700/275
See application file for complete search history.

(56) References Cited

U.S. PATENT DOCUMENTS

| | | | | |
|---|---|---|---|---|
| 2002/0151993 | A1* | 10/2002 | Olesen ................ | H02P 23/0077 700/86 |
| 2007/0187367 | A1* | 8/2007 | Kita ......................... | B23H 7/26 219/69.11 |
| 2010/0228697 | A1* | 9/2010 | Komiya .................. | G06F 17/50 706/54 |
| 2015/0212518 | A1* | 7/2015 | Umeda ..................... | H02P 5/46 318/567 |
| 2016/0140264 | A1* | 5/2016 | Miura ................. | G06F 17/5009 703/2 |

FOREIGN PATENT DOCUMENTS

| | | |
|---|---|---|
| DE | 10156330 A1 | 4/2003 |
| DE | 102005029038 A1 | 1/2007 |
| EP | 3012967 A1 | 4/2016 |
| JP | 2010187464 A * | 8/2010 |
| JP | 2010187464 A | 8/2010 |
| JP | 2015-27244 A | 2/2015 |
| WO | 2014054142 A1 | 4/2014 |

OTHER PUBLICATIONS

Harmonic Drive AG, "Application Manual AC Servo Controller YukonDrive" Jan. 2012, 184 Pgs. (Year: 2012).*
English Abstract and Machine Translation for Japanese Publication No. 2015-027244 A, published Feb. 5, 2015, 35 pgs.
English Abstract for Japanese—WO Publication No. JPWO2014-054142 A1, published Apr. 10, 2014, 1 pg.
English Abstract and Machine Translation for Japanese Publication No. 2010-187464 A, published Aug. 26, 2010, 25 pgs.
English Abstract and Machine Translation for Chinese Publication No. 102611366 A, published Jul. 25, 2012, 7 pgs.
English Abstract and Machine Translation for Chinese Publication No. 101878589 A, published Nov. 3, 2010, 15 pgs.
English Abstract and Machine Translation for German Publication No. 102005029038 A1, published Jan. 4, 2007, 7 pgs.
English Abstract and Machine Translation for German Publication No. 10156330 A1, published Apr. 24, 2003, 16 pgs.

* cited by examiner

SELECTION DEVICE AND NETWORK SYSTEM FOR SELECTING ELECTRIC MOTOR SYSTEM

BACKGROUND OF THE INVENTION

1. Field of the Invention

The invention relates to a selection device for selecting an electric motor system, and a network system.

2. Description of the Related Art

A selection device for selecting an electric motor system which meets the conditions input by the user is known (e.g., Japanese Unexamined Patent Publication (Kokai) No. 2015-27244).

When a machine such as a machine tool is designed using the selected electric motor system, the user may preferably set a controller which drives the electric motor system at the start of the machine. A technique may be preferably involved in reducing labor involved in such a setting operation.

SUMMARY OF INVENTION

According to an aspect of the invention, a selection device for selecting an electric motor system includes an information reception part which receives an input machine condition, a storage which stores specification data representing performances of a plurality of electric motor systems, and a selection part which compares the machine condition received by the information reception part with the specification data stored in the storage, and selects the electric motor system that meets the machine condition from the plurality of electric motor systems.

The selection device further includes a parameter generation part which generates a controller parameter for setting an operation parameter in a controller which controls the electric motor system selected by the selection part. The operation parameter is necessary for the controller to operate the selected electric motor system.

The electric motor system may include an electric motor and an amplifier which supplies power to the electric motor. The specification data may include electric motor specification data representing performances of the plurality of electric motors, and amplifier specification data representing performances of the plurality of amplifiers.

The selection part may compare the machine condition received by the information reception part with the electric motor specification data, and selects the electric motor that meets the machine condition received by the information reception part from the plurality of electric motors. The selection part may select the amplifier capable of driving the selected electric motor from the plurality of amplifiers with reference to the amplifier specification data.

The storage may store the controller parameter in association with the electric motor system. The parameter generation part may read out from the storage, the controller parameter associated with the electric motor system selected by the selection part.

According to another aspect of the invention, a network system includes the above-mentioned selection device, and a terminal which is communicably connected to the information reception part via a network, and which receives input of the machine condition from a user.

BRIEF DESCRIPTION OF THE DRAWINGS

The above and other objects, features, and advantages of the invention will become more apparent from the following description of embodiments, with reference to the accompanying drawings, in which.

DETAILED DESCRIPTION

Embodiments of the invention will be described in detail below, with reference to the drawings. First, a network system 10 according to an embodiment of the invention will be described with reference to FIG. 1. The network system 10 includes a plurality of terminals 12, 14 and 16, a network 18, and a selection device 50.

Figure 1:
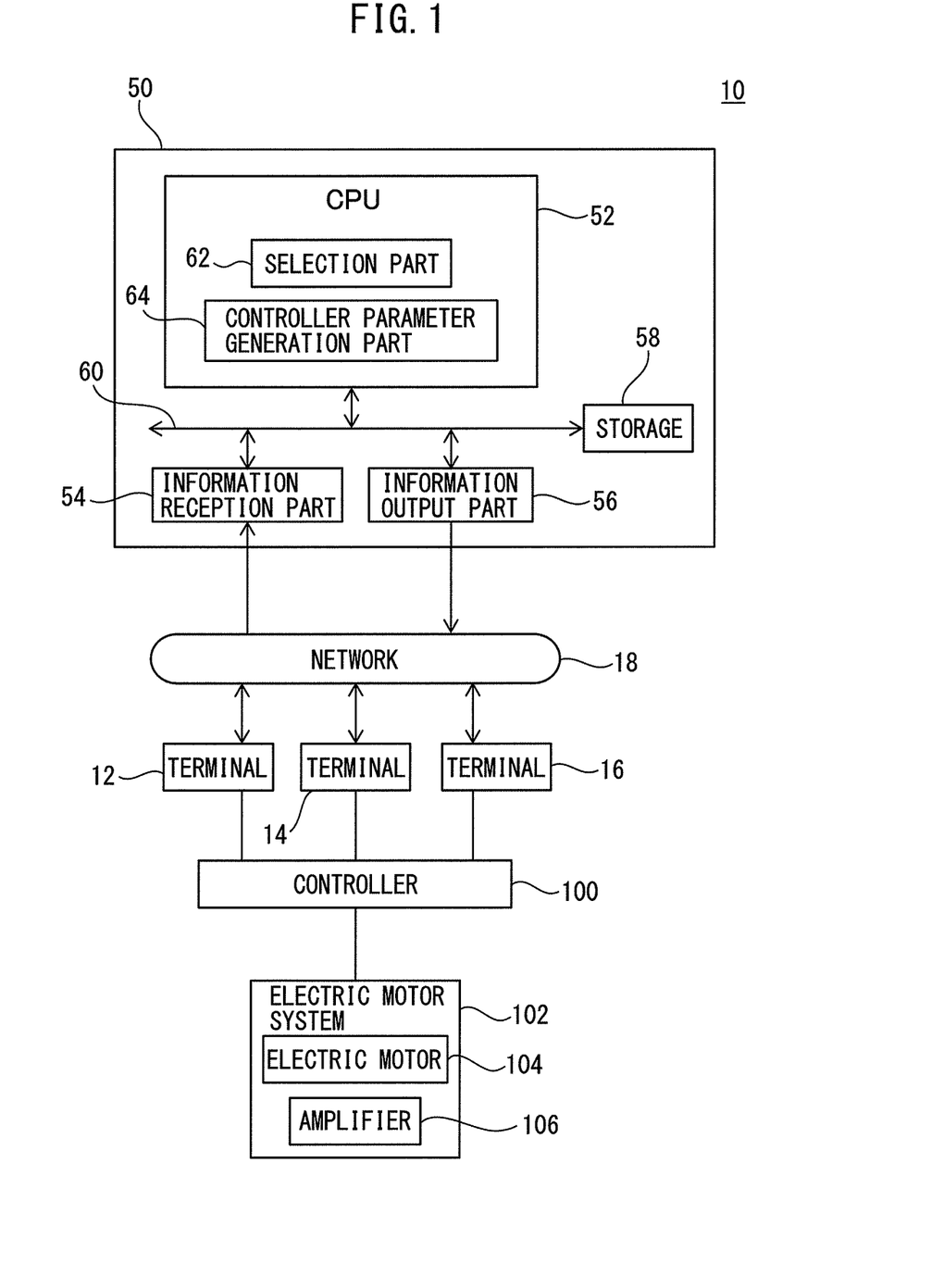
FIG. 1 is a block diagram illustrating a network system according to an embodiment of the invention.

Each of the terminals 12, 14, and 16 is a computer including e.g. a CPU, a display, and a keyboard, and is installed outside of the selection device 50. The user can input information to the terminals 12, 14, and 16. The terminals 12, 14 and 16 are connected to an information reception part 54 and an information output part 56 of the selection device 50 via the network 18 so as to be able to communicate with the information reception part 54 and the information output part 56.

The terminals 12, 14 and 16 send information input by the user to the information reception part 54 of the selection device 50 via the network 18. Further, the terminals 12, 14 and 16 receive information sent from the information output part 56 of the selection device 50 via the network 18. The network 18 is a communication network such as the Internet or a LAN.

The terminals 12, 14 and 16 are connected to a controller 100. The controller 100 is e.g. a robot controller which controls an industrial robot, or a machine tool controller which controls a machine tool such as an NC machining center, and controls an operation of an electric motor system 102.

The electric motor system 102 includes an electric motor 104 and an amplifier 106 which supplies power to the electric motor 104. The electric motor 104 is e.g. a servomotor built in a robot arm of an industrial robot or in a main shaft of a machine tool. The amplifier 106 supplies electric power to the electric motor 104 so as to drive the electric motor 104 to rotate, in accordance with a command from the controller 100.

The selection device 50 includes a CPU (Central Processing Unit) 52, an information reception part 54, an information output part 56, and a storage 58. The CPU 52 is communicably connected to the information reception part 54, the information output part 56, and the storage 58 via buses 60. The CPU 52 executes various arithmetic processes along with communicating with the information reception part 54, the information output part 56, and the storage 58.

As described above, the information reception part 54 is connected to the terminals 12, 14 and 16 via the network 18, and receives information sent from the terminals 12, 14 and 16. The information reception part 54 sends the information received from the terminals 12, 14 and 16 to the CPU 52.

Further, the information output part 56 is connected to the terminals 12, 14 and 16 via the network 18, and sends information to the terminals 12, 14 and 16 via the network 18, in accordance with a command from the CPU 52.

The storage 58 is an electrically erasable and recordable nonvolatile memory, such as an EEPROM®, or a high-speed readable and writable random access memory, such as a DRAM or an SRAM.

The storage 58 pre-stores specification data of the electric motor system 102 and some of controller parameters. These specification data and the controller parameters will be described later.

The operation of the selection device 50 will be described below with reference to FIGS. 2 to 5. At step S1, the information reception part 54 receives information of the machine conditions input by the user. More specifically, the user operates the terminal 12, 14 or 16 so as to input the machine conditions of the desired electric motor system.

As an example, the terminal 12, 14 or 16 displays a data input image as represented as Table 1 as follows:

TABLE 1

| Machine Conditions for Electric motor System |
| --- |
| Moving Distance [mm] |
| Positioning Time [sec] |
| Feed Speed [mm/min] |
| Rotational-rectilinear Motion Conversion Coefficient [mm/Rad] |

In the above-mentioned example, the user inputs the machine conditions of the desired electric motor system into the fields of "Moving Distance," "Positioning Time," "Feed Speed," and "Rotational-rectilinear Motion Conversion Coefficient". The terminals 12, 14 or 16 send information of the machine conditions input by the user to the information reception part 54 via the network 18. The information reception part 54 receives the information of the machine conditions from the terminal 12, 14 or 16.

Figure 2:
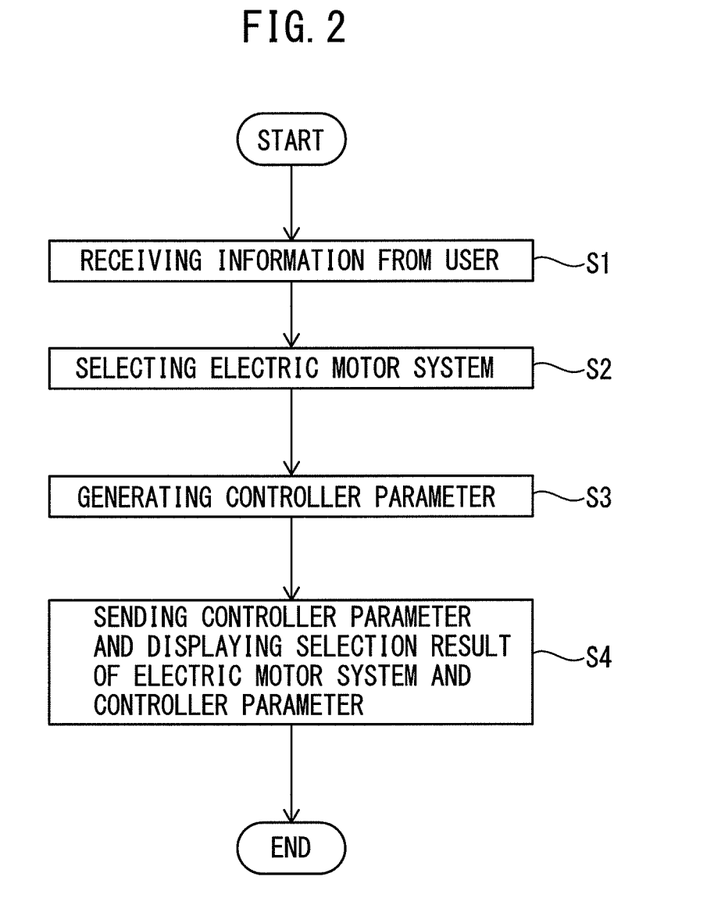
FIG. 2 is a flowchart illustrating an exemplary operation flow of the selection device illustrated as FIG. 1.

At step S2, the CPU 52 selects an electric motor system. More specifically, the CPU 52 compares the machine conditions received at step S1 with specification data pre-stored in the storage 58. The specification data represents the performances of a plurality of electric motor systems applicable as the above-mentioned electric motor system 102. Examples of the specification data are given in Tables 2 and 3 as follows:

TABLE 2

| Electric motor Model Number | M-01 | M-02 | M-03 | ... |
| --- | --- | --- | --- | --- |
| Rated Power [W] | 50 | 100 | 150 | ... |
| Rated Torque [N · m] | 0.16 | 0.33 | 0.48 | ... |
| Rotor Moment of Inertia × $10^{-4}$ [kg · m$^2$] | 0.04 | 0.066 | 0.092 | ... |
| Allowable Load Moment of Inertia (Multiplication of Rotor Moment of Inertia) | 40 | 20 | 15 | ... |
| Torque-Velocity Characteristic | P1 | P2 | P3 | ... |

TABLE 3

| Amplifier Model Number | A-01 | A-02 | A-03 | ... |
| --- | --- | --- | --- | --- |
| Rated Output Current [A] | 1.1 | 3.3 | 11 | ... |
| Power Supply of Main Circuit Rated Current [A] | 0.9 | 3.3 | 10.5 | ... |
| Power Supply of Control Circuit | 30 | 30 | 45 | ... |

TABLE 3-continued

| Amplifier Model Number | A-01 | A-02 | A-03 | ... |
| --- | --- | --- | --- | --- |
| Power Consumption [W] Allowable Regenerative Power [W] | 10 | 10 | 20 | ... |

Table 2 represents specification data (electric motor specification data) of a plurality of electric motors applicable as the above-mentioned electric motor 104. The electric motor specification data stored in the storage 58 includes information representing the performances of a plurality of types of electric motors, as illustrated as Table 2.

Figure 3:
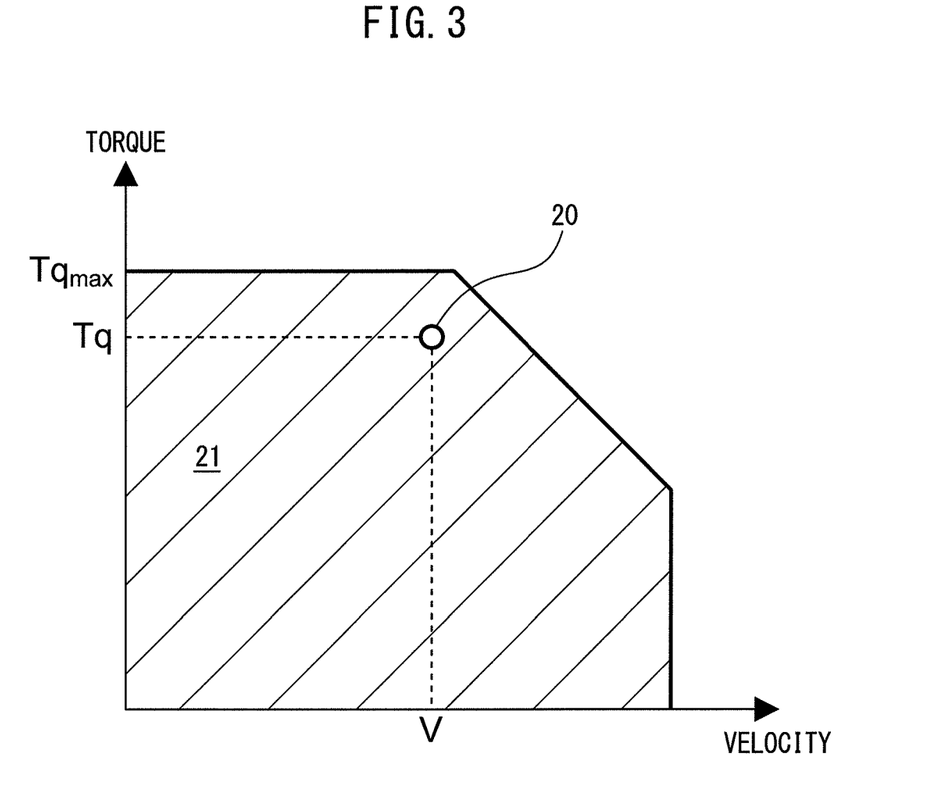
FIG. 3 illustrates an exemplary torque-velocity characteristic of an electric motor.

FIG. 3 illustrates an exemplary torque-velocity characteristic P1, P2, or P3 in Table 2. The storage 58 stores, as the electric motor specification data, the torque-velocity characteristic as illustrated in FIG. 3, in association with each electric motor.

Table 3 represents specification data (amplifier specification data) of a plurality of amplifiers applicable as the above-mentioned amplifier 106. The amplifier specification data stored in the storage 58 includes information representing the performances of a plurality of types of amplifiers, as illustrated in Table 3.

At this step S2, the CPU 52 compares the machine conditions received at step S1 with the electric motor specification data shown in Table 2, and selects an electric motor, which meets the machine conditions received at step S1, from the plurality of types of electric motors included in the electric motor specification data.

Figure 4:
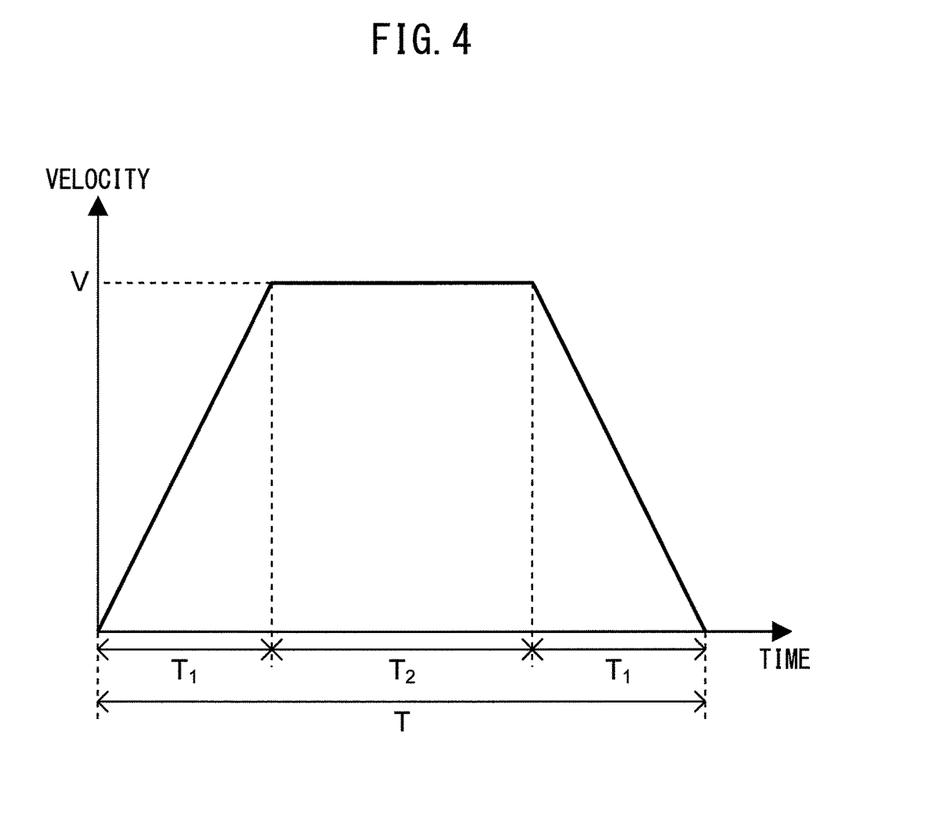
FIG. 4 illustrates an exemplary velocity-time characteristic calculated at step S2 in FIG. 2.

As an example, the CPU 52 generates a data table of the velocity-time characteristic from the machine conditions received at step S1. FIG. 4 illustrates an example of the velocity-time characteristic. A period $T_1$ in FIG. 4 represents the period during which the electric motor accelerates or decelerates, while a period $T_2$ in FIG. 4 represents the period during which the electric motor operates at a constant velocity. A velocity V represents the maximum rotational velocity at the time of positioning, which can be obtained from the "Feed Speed," represented in Table 1 received from the user.

The periods $T_1$ and $T_2$ can be obtained by following formulas 1 and 2, in which T is the positioning time in Table 1, X is the moving distance in Table 1, and N is the feed speed in Table 1.

$$T_1 = T - (60X/N) \quad \text{(Formula 1)}$$

$$T_2 = (120X/N) - T \quad \text{(Formula 2)}$$

Further, a maximum velocity V ([min$^{-1}$]) at the time of positioning can be obtained by following formula 3, in which R is the rotational-rectilinear motion conversion coefficient in Table 1.

$$V = N/2\pi R \quad \text{(Formula 3)}$$

An angular acceleration A ([rad/sec$^2$]) at the time of acceleration or deceleration of the electric motor can be obtained by following formula 4.

$$A = 2\pi V/60 T_1 \quad \text{(Formula 4)}$$

The CPU 52 obtains a torque $T_q$ ([Nm]) at the time of acceleration or deceleration of the electric motor by substituting the angular acceleration A obtained from formula 4 into following formula 5, in which J is the total moment of inertia ([kg·m$^2$]).

$$T_q = JA \quad \text{(Formula 5)}$$

Figure 5:
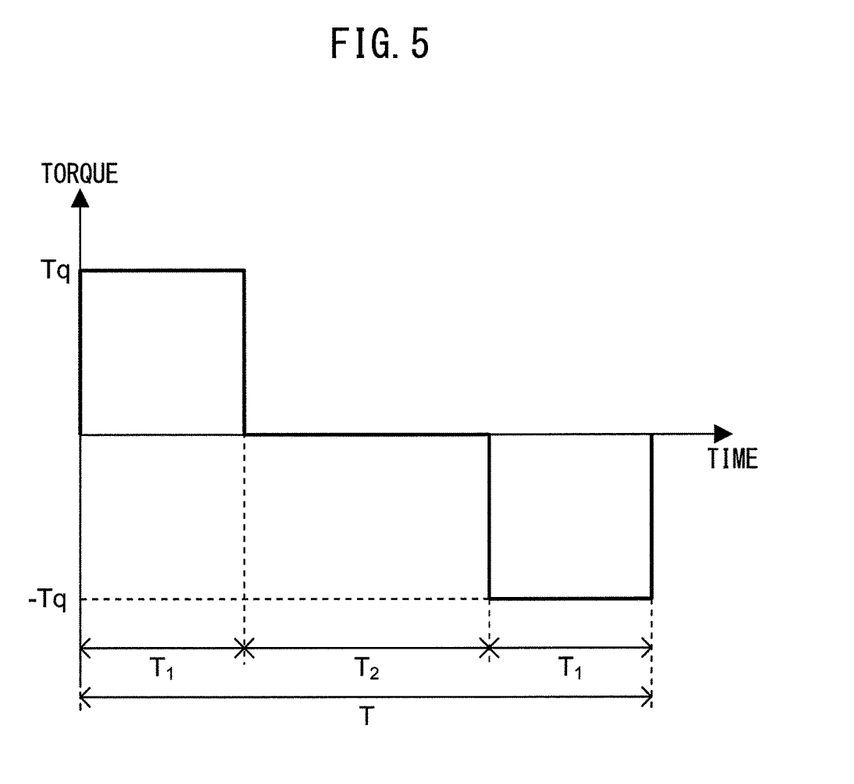
FIG. 5 illustrates an exemplary torque-time characteristic calculated at step S2 in FIG. 2.

By such a method, the CPU 52 calculates the torque $T_q$ from the machine conditions received at step S1, and generates a data table of the torque-time characteristic as shown in FIG. 5. The CPU 52 applies the calculated torque $T_q$ and the maximum rotational velocity V at the time of positioning to the torque-velocity characteristic P1, P2, P3 of each electric motor illustrated in FIG. 3. A point 20 in FIG. 3 illustrates an exemplary case where the maximum rotational velocity V at the time of positioning and the torque $T_q$ are plotted onto the torque-velocity characteristic.

The CPU 52 selects an electric motor, which has a torque-velocity characteristic in which the calculated torque $T_q$ (i.e., the point 20 in FIG. 3) can fall within a hatched region 21 in FIG. 3, from a plurality of electric motors included in the electric motor specification data.

Then, the CPU 52 selects an amplifier, which can drive the selected electric motor, from a plurality of types of amplifiers included in the amplifier specification data. As an example, each amplifier represented in Table 3 is associated with a drivable electric motor among a variety of electric motors represented in Table 2.

In this case, when the CPU 52 selects an electric motor which meets the machine conditions received at step S1, it uniquely selects amplifiers associated with the selected electric motor from a variety of amplifiers represented in Table 3.

Assuming that, as amplifiers capable of driving the electric motor having electric motor model number M-02 in Table 2, a total of three types of amplifiers having amplifier model numbers A-01, A-02, and A-03 in Table 3 are associated with the electric motor M-02.

In this case, when the CPU 52 selects the electric motor having electric motor model number M-02 which meets the machine conditions received at step S1, the CPU 52 selects three types of amplifiers having amplifier model numbers A-01, A-02, and A-03 from the amplifier specification data represented in Table 3.

Thus, in this embodiment, the CPU 52 functions as a selection part 62 which selects an electric motor system (i.e., an electric motor and amplifier), which meets the machine conditions received at step S1, from a plurality of electric motor systems.

At step S3, the CPU 52 generates controller parameters. When the above-mentioned controller 100 actually operates the electric motor system 102, operation parameters, which are necessary to operate the electric motor system 102, should be set in the controller 100.

The operation parameters include parameters relating to the specification of an electric motor, such as the rated power and the rated torque represented in Table 2, and parameters relating to the specification of an amplifier, such as the rated output current and the allowable regenerative power represented in Table 3.

Further, the operation parameters include parameters according to the operation characteristics represented in FIGS. 4 and 5, such as the acceleration/deceleration time constant τ upon acceleration or deceleration of an electric motor, and parameters relating to various functions such as the power monitoring function, the power anomaly detection function, and the temperature anomaly detection function.

The controller parameters according to this embodiment are data which include the information of each of the above-mentioned operation parameters, and which can automatically set each operation parameter in the controller 100 when being loaded into the controller 100.

At this step S3, the CPU 52 generates controller parameters including information of the operation parameters relating to the specification of an electric motor, such as the rated power and the rated torque, and of the operation parameters relating to the specification of an amplifier, such as the rated output current and the allowable regenerative power.

For example, the storage 58 pre-stores controller parameters corresponding to the operation parameters (e.g., the rated power and the rated torque) relating to the specification of an electric motor, in association with each electric motor included in the electric motor specification data represented in Table 2.

Further, the storage 58 pre-stores controller parameters corresponding to the operation parameters (e.g., the rated output current and the allowable regenerative power) relating to the specifications of an amplifier, in association with each amplifier included in the amplifier specification data represented in Table 3. At this step S3, the CPU 52 reads out the controller parameters from the storage 58.

Further, at this step S3, the CPU 52 generates controller parameters corresponding to the operation parameters (e.g., the acceleration/deceleration time constant τ) according to the operation characteristics of an electric motor system. For example, regarding the acceleration/deceleration time constant τ, the CPU 52 sets the period $T_1$ calculated at step S2 as this acceleration/deceleration time constant τ (i.e., $\tau=T_1$), and generates a controller parameter including the information of the acceleration/deceleration time constant τ.

Further, at this step S3, the CPU 52 generates controller parameters corresponding to the operation parameters relating to various functions (e.g., the power monitoring function, the power anomaly detection function, and the temperature anomaly detection function).

As an example, the storage 58 pre-stores the controller parameters relating to various functions, in association with a variety of amplifiers represented in Table 3. Examples of the controller parameters relating to various functions are given in Table 4 as follows:

TABLE 4

| Amplifier Model Number | A-01 | A-02 | A-03 | ... |
|---|---|---|---|---|
| Power Monitoring Function | 1-1 | 2-1 | 3-1 | ... |
| Power Anomaly Detection Function | 1-2 | 2-2 | 3-2 | ... |
| Temperature Anomaly Detection Function | 1-3 | 2-3 | 3-3 | ... |

As shown in Table 4, each of a variety of amplifiers is associated with controller parameters (1-1, 1-2, . . . 3-3) corresponding to various functions. For example, an amplifier having amplifier model number A-02 in Table 4 is associated with the controller parameter 2-1 for the power monitoring function, the controller parameter 2-2 for the power anomaly detection function, and the controller parameter 2-3 for the temperature anomaly detection function.

At this step S3, the CPU 52 reads out from the storage 58, the controller parameters corresponding to the functions, which are associated with the electric motor system selected at step S2.

For example, if the amplifier numbered as A-02 is selected at step S2, the CPU 52 reads out from the storage 58, the controller parameters 2-1, 2-2, and 2-3 associated with the amplifier numbered as A-02.

In this way, the CPU 52 generates controller parameters corresponding to the specification of an electric motor system, to the operation characteristics of the electric motor system, and to various functions of the electric motor system, at this step S3. Thus, in this embodiment, the CPU 52 functions as a controller parameter generation part 64 (FIG. 1) which generates a controller parameter.

At step S4, the CPU 52 sends the controller parameters generated at step S3 to the terminal 12, 14 or 16 via the information output part 56, together with the selection result of the electric motor system (electric motor and amplifiers) selected at step S2.

The terminal 12, 14 or 16 receives the controller parameters and the selection result of the electric motor system, which have been sent in accordance with the sequence illustrated in FIG. 2. Then, the display of the terminal 12, 14, or 16 displays a list of electric motor systems (electric motors and amplifiers) selected at step S2.

Together with this, the display displays the information of respective operation parameters (e.g., the rated power, the rated torque, the rated output current, the allowable regenerative power, the acceleration/deceleration time constant, and various functions) of the selected electric motor system, which are included in the controller parameters. Then, the CPU 52 ends the flow shown in FIG. 2.

The user can confirm a list of electric motor systems which meet the required machine conditions, together with the operation parameters of these electric motor systems. When starting up a machine such as a machine tool with using an electric motor system, the user operates the keyboard of the terminal 12, 14 or 16 so as to select an electric motor system suitable for a specific application from the electric motor systems selected by the selection device 50 as described above.

The terminal 12, 14 or 16 sends the controller parameters of the electric motor system selected by the user to the controller 100. The thus-sent controller parameters are loaded into the controller 100, as a result of which, respective operation parameters included in the controller parameters are set in the controller 100.

More specifically, operation parameters relating to the specification of an electric motor, such as the rated power and the rated torque shown in Table 2, and operation parameters relating to the specification of an amplifier, such as the rated output current and the allowable regenerative power shown in Table 3, are set in the controller 100. Further, the parameters according to the operation characteristics such as the acceleration/deceleration time constant τ upon acceleration or deceleration of an electric motor are also set in the controller 100.

Further, the controller parameters (e.g., 2-1, 2-2, and 2-3) for various functions are used to "enable" various functions, such as the power monitoring function, the power anomaly detection function, and the temperature anomaly detection function, in the controller 100.

The user applies the electric motor system (electric motor and amplifiers) selected by himself or herself to the electric motor system 102 (electric motor 104 and amplifier 106) illustrated as FIG. 1, and connects it to the controller 100. At this time, in the controller 100, setting of each operation parameter of the connected electric motor system 102 has been already completed.

As described above, in this embodiment, the CPU 52 selects an electric motor system which meets the machine conditions input by the user, and generates the controller parameters which can set the operation parameters of the selected electric motor system in the controller 100.

According to this configuration, since the operation parameters can be aoutomatically set in the controller 100 by the generated controller parameters, it is not necessary for the user to operate the controller 100 to set the operation parameters for the selected electric motor system 102. Therefore, it is possible to relieve the burden of setting for operating the electric motor system.

Further, according to this embodiment, the user can confirm the selection result of the electric motor system, together with the operation parameters (e.g., the rated power, the rated torque, the rated output current, the allowable regenerative power, the acceleration/deceleration time constant, and various functions) of the selected electric motor system. This makes it easy for the user to select an electric motor system suitable for a specific application.

Further, according to this embodiment, the terminals 12, 14 and 16 and the selection device 50 are connected to each other via a network. Therefore, if the terminals 12, 14 and 16 are installed at a site of a machine tool manufacturer while the selection device 50 is installed at a site of an electric motor manufacturer, the machine tool manufacturer can quickly and easily select the latest electric motor system manufactured by the electric motor manufacturer, and utilize it to design a machine tool or the like.

Further, if the electric motor manufacturer timely updates the controller parameters stored in the storage 58, the user can always use the latest functions of the electric motor system.

In the above-described embodiment, the terminals 12, 14, and 16 are connected to the controller 100, and controller parameters are sent from the terminal 12, 14, or 16 to the controller 100.

However, the invention is not limited to this, and the terminals 12, 14, and 16 may not be directly connected to the controller 100. In this case, for example, the user may store controller parameters received by the terminal 12, 14, or 16 in an external memory such as a flash memory and load the controller parameters from the external memory into the controller 100.

Alternatively, the terminals 12, 14, and 16 may be wirelessly connected to the controller 100. In this case, the terminals 12, 14, and 16 may send the received controller parameters to the controller 100 by radio and load them into the controller 100.

In the above-described embodiment, the terminal 12, 14, or 16 may be configured to, when controller parameters received from the CPU 52 are presented to the user, receive input of information from the user and enable the user to edit the controller parameters.

In this case, the user operates, e.g., a keyboard for the terminal 12, 14, or 16 to edit the enable/disable of the function (power monitoring function) of the controller parameter displayed on the display of the terminal 12, 14, or 16.

The terminal 12, 14, or 16 edits controller parameters received from the CPU 52, in response to input from the user, and sends the edited controller parameters to the controller 100.

Before step S1, the terminal 12, 14, or 16 may display input images corresponding to various operation parameters, in addition to the data input image represented as Table 1.

In inputting machine conditions for selecting an electric motor system, the user may input information regarding various operation parameters (e.g., the rated power, the rated torque, the rated output current, the allowable regenerative power, the acceleration/deceleration time constant, and various functions), in addition to information regarding the machine conditions of the electric motor system.

In this case, at step S2, the CPU 52 may select an electric motor system in consideration of information regarding the functions input from the user, in addition to the machine conditions of the electric motor system.

When, for example, the user selects the "Power Monitoring Function" upon information input to the terminal 12, 14, or 16, the CPU 52 refers to controller parameters, as represented as Table 4 mentioned above, to exclude any electric motor system having no "Power Monitoring Function" as a candidate to be selected at step S2.

Alternatively, when the user inputs the "Acceleration/deceleration Time Constant" as "$\tau_1$," the CPU 52 may calculate a torque $T_q$ assuming that an acceleration/deceleration time constant $\tau$ (e.g., a period $T_1$)=$\tau_1$ and select an electric motor system at step S2.

In the above-described embodiment, parameters as represented as Tables 2 and 3 have been taken as exemplary specification data of an electric motor system. However, the invention is not limited to this, and the specification data of an electric motor system may include, e.g., the break point information or seal friction torque, as disclosed in, e.g., Japanese Unexamined Patent Publication (Kokai) No. 2015-27244.

Further, in the above-described embodiment, an input image as represented as Table 1 has been taken as an exemplary information input window for allowing the user to input information regarding the machine conditions of an electric motor system. However, the invention is not limited to this, and input fields for other parameters such as the angle of positioning, the requested stop time, or the torque limit, as disclosed in Japanese Unexamined Patent Publication (Kokai) No. 2015-27244, may be provided as an information input window.

In this case, at step S2, the CPU 52 may select an electric motor system using a technique as disclosed in Japanese Unexamined Patent Publication (Kokai) No. 2015-27244, in consideration of other parameters such as the angle of positioning, the requested stop time, or the torque limit.

In the above-described embodiment, controller parameters associated with the functions of an amplifier, as represented as Table 4, have been taken as exemplary controller parameters associated with functions.

However, the invention is not limited to this, and, for example, the storage 58 may store controller parameters (e.g., the load torque limiter) associated with the functions of an electric motor. In this case, at step S3, the CPU 52 reads the controller parameters associated with the functions of an electric motor from the storage 58.

Further, in the above-described embodiment, the terminals 12, 14, and 16 are connected to the selection device 50 via the network 18. However, the invention is not limited to this, and the terminals 12, 14, and 16 and the selection device 50 may be directly connected to each other without a network. The terminals 12, 14, and 16 and the network 18, or the network 18 and the selection device 50 may even be connected to each other by wire or wirelessly.

The storage 58 may be built into the selection device 50 or built into an external device (e.g., a server) communicably connected to the CPU 52 via a network. The selection device 50 may include a first storage which stores specification data, and a second storage which stores function data.

The number of terminals 12, 14, and 16 is not limited to three, and one or any number of terminals may be used.

Although the invention has been described above through an embodiment of the invention, the above-described embodiment is not intended to limit the invention according to the scope of claims. Although combinations of the features described in the embodiment of the invention may also fall within the technical scope of the invention, all the combinations of the features may not always be involved in solving the problem of the invention. It is obvious to those skilled in the art that various changes or modifications may be made in the above-described embodiment.

It should be noted that each type of processing such as operations, procedures, steps, processes, and stages in a device, a system, a program, and a method illustrated in the scope of claims, the specification, and the drawings may be implemented in an arbitrary order unless otherwise specified as, e.g., "before" or "prior to" or the output of preceding processing is used in subsequent processing. Even when an operation sequence in the scope of claims, the specification, and the drawings is described using, e.g., "first," "next," or "subsequently" for the sake of convenience, this does not mean that the operation sequence is always performed in such a specific order.

The invention claimed is:

1. A selection device for selecting an electric motor system, comprising:
   an information reception part which receives an input machine condition;
   a storage which previously stores specification data representing performances of a plurality of electric motor systems and controller parameters each for setting an operation parameter in a controller which controls the electric motor system, the operation parameter being necessary for the controller to operate the electric motor system,
   the specification data comprising one or more of rated power, rated torque, rated output current, or allowable regenerative power,
   the operation parameters including:
      the specification data; and
      one or more of power monitoring function, power anomaly detection function, or temperature anomaly detection function,
   the controller parameters including information of each of the operating parameters,
   the specification data and the controller parameters being previously stored in association with the respective electric motor systems, each controller parameter being loaded into the controller, wherein the controller is configured to automatically set the operation parameter for operating the electric motor system when being loaded into the controller;
   a selection part which compares the machine condition received by the information reception part with the specification data stored in the storage, and selects the electric motor system, which meets the machine condition, from the plurality of electric motor systems; and
   a parameter generation part which reads out from the storage the controller parameter associated with the electric motor system selected by the selection part to output the controller parameter,
   wherein the controller parameter output from the parameter generation part is loaded into the controller such that the controller automatically sets the operation parameter in the controller.

2. The selection device according to claim 1, wherein the electric motor system includes an electric motor and an amplifier which supplies power to the electric motor, wherein
   the specification data includes electric motor specification data representing performances of a plurality of electric motors, and amplifier specification data representing performances of a plurality of amplifiers, wherein the selection part compares the machine condition received by the information reception part with the electric motor specification data, and selects the electric motor, which meets the machine condition received by the information reception part, from the plurality of electric motors, wherein the selection part selects the amplifier capable of driving the selected electric motor from the plurality of amplifiers, with reference to the amplifier specification data.

3. A network system comprising:

a selection device according to claim 1; and a terminal which is connected to the information reception part via a network so as to be able to communicate with the information reception part, and which receives input of the machine condition from a user.

* * * * *